June 14, 1955 B. D. KUMPFER 2,710,919

ELECTRONIC TUNING MEANS

Filed May 3, 1950

*INVENTOR.*
BEVERLY D. KUMPFER
*BY*
Harry M. Saragovitz
Attorney 2,710,919

ELECTRONIC TUNING MEANS

Beverly D. Kumpfer, Spring Lake Heights, N. J., assignor to the United States of America as represented by the Secretary of the Army Application May 3, 1950, Serial No. 159,800

1 Claim. (Cl. 250—36)

(Granted under Title 35, U. S. Code (1952), sec. 266)

The invention described herein may be manufactured and used by or for the Government for governmental purpose, without the payment of any royalty thereon.

This application is the parent of application Serial No. 311,339, filed September 23, 1952.

The invention relates to a device for electronically tuning resonant structures and more particularly to microwave generators employing wave guides and cavity resonators whose frequency characteristics can be varied by electronic means. While the invention is subject to a wide range of applications, it is especially suited for use with microwave generators such as magnetrons and klystron tubes whose output wavelength depends upon the dimensions of an external tuned circuit.

In conventional microwave generator circuits, the output frequency is controlled primarily by the resonant frequency of the cavity resonator. When klystrons or magnetrons are employed, the operating frequency is primarily a function of the cavity resonator dimensions which may be changed mechanically or electronically. Mechanical tuning is generally accomplished by employing plungers to change the physical dimensions of the cavity resonator while electronic tuning is achieved by injecting electrons into the resonant system in order to change the electrical characteristics thereof. Heretofore, electronic tuning for both klystrons and magnetrons has been accomplished by injecting an electron beam of variable intensity into a region of high R.-F. electric fields within the resonator. For magnetron generators, the variable intensity of the electron beam is analogous to a variable dielectric constant in the cavity resonator, hence a variable resonant frequency of the oscillator.

When magnetrons are employed, the tuning range for efficient operation is limited by the fact that sufficiently high beam current necessary for wide frequency deviations are difficult to achieve, and moreover, in view of the high R.-F. fields present in the magnetron cavity, no control of the high density beam within the cavity would be possible. In tuning reflex klystrons, it is well known that for efficient operation the tuning range can be varied electronically only between narrow limits, the frequency deviations varying only slightly on either side of the fundamental resonator frequency.

Accordingly, it is an object of this invention to provide an electric discharge device which operates to electronically tune a resonant structure over a wide range of frequencies.

It is still another object to provide a resonator whose frequency is electronically varied by adjusting the position of an electron space current within said resonator.

In accordance with my invention a microwave generating apparatus comprises a resonant circuit and means for producing and controlling an electron space current, or space charge, within said resonant circuit to effectively tune the output of the microwave generator through a wide range of frequencies.

For a better understanding of the present invention, together with other and further objects thereof, reference is made to the following description taken in connection with the accompanying drawings in which.

Similar characters of reference are used in all of the above figures to indicate corresponding parts.

Figure 1:
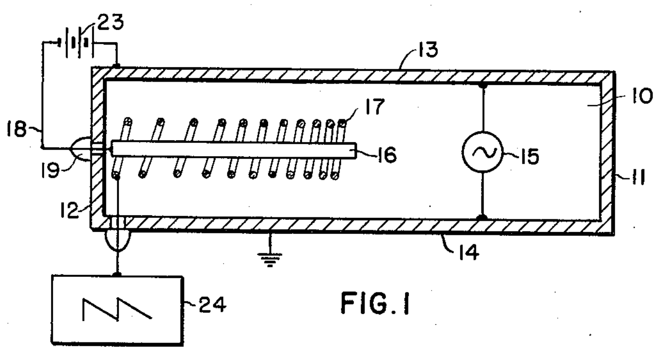
Fig. 1 illustrates schematically and in longitudinal section one embodiment constructed in accordance with the principles of the present invention.

Referring now to Fig. 1 there is shown a broadband microwave tuning device comprising an evacuated wave guide 10, a high frequency generating source 15 enclosed therein, a cathode 16 centrally positioned within a portion of wave guide 10, a variable spaced grid 17 surrounding cathode 16 for the entire length thereof, a potential source 23 which is applied between wave guide 10 and cathode 16, and grid voltage modulating source 24. The showing of Fig. 1 is a schematic in that the construction of the high frequency generating source, which may comprise a suitable magnetron oscillator, the arrangement for applying operating potentials thereto, and means for its support within wave guide 10 are not shown. Such details are well known and do not constitute any part of my invention.

As shown in Fig. 1, evacuated rectangular wave guide 10 is closed at both ends to form a resonant structure. The rectangular cross-section of wave guide 10 has a major dimension somewhat larger than one-half of the maximum wavelength of the energy corresponding to the lower limit of the frequency range through which it is desired to operate, and a minor dimension much smaller than one-half of said wavelength. Generating source 15 may be spaced from closed end 11 by dimensions corresponding to odd-quarter multiples of the wavelength in the guide of the frequency which is mid-way between the upper and lower frequency limits of the desired operating range. The output of generating source 15 is so polarized that a transverse electric wave, or TE mode, is generated within wave guide 10. Thus, electric lines of force extend between the two wide walls 13 and 14 of the wave guide. Ribbon-like cathode 16 is centrally positioned along the longitudinal axis of wave guide 10 between closed end 12 and generating source 15 and is coated with an electron emissive material only on the two surfaces facing said wide walls. It is supported in position by lead 18 which extends through an aperture in closed end 12 and through glass seal 19. If further support is necessary, a mica spacer (not shown) may be employed in the conventional manner at the generator end. The length of cathode 16 within wave guide 10 is determined by the desired maximum operating frequency as explained below. Grid 17 surrounds cathode 16 for the entire length thereof and the spacing between successive grid turns progressively decreases at a constant rate so that the grid wires surrounding cathode 16 at the generator end will be closer together than the grid wires at the other end of said cathode. Thus, as shown in Fig. 1, the pitch between grid wires are progressively decreased as they approach generating source 15. Wave guide 10 is maintained at a positive potential with respect to cathode 16 by D. C. voltage source 23 which is applied between said cathode and the outer surface of the wave guide.

In the operation of the device illustrated in Fig. 1, an electron cloud, or space charge, is created in the region between the coated surfaces of cathode 16 and wide walls 13 and 14 due to the electron space current between said cathode and wave guide 10. It will be shown in the following, that variations in the length of the space current charge along the cathode and, incidentally along the longitudinal axis of the wave guide 10, may be used to modify the frequency of resonance of the structure, hence vary the output frequency of generator 15.

As has been previously explained, transverse electric lines of force are generated in wave guide 10 by high frequency generating source 15 and, since the space charge is parallel to the lines of electrostatic force, said space charge forms a transverse electronic short between wide walls 13 and 14. The spacing between the innermost position of the electronic short and generator 15 determines the operating resonant frequency. This is equivalent to the complete elimination of the section of wave guide 10 between closed end 12 and the innermost position of the transverse electronic short and will have results similar to decreasing the length of the wave guide. Reducing the length of the wave guide will decrease the resonant wavelength of the structure and thus tend to increase the frequency output from source 15, with which it is associated. Thus, with the space charge distributed along the longitudinal axis of the wave guide for the entire length of cathode 16, the resonant frequency will be at a maximum. Accordingly, the length of cathode 16 within wave guide 10 is determined by the upper limit, or maximum frequency, of the desired frequency range.

The innermost position of the transverse electronic short across the wave guide may be varied by applying to grid 17 a source 24 of variable voltage with which it is desired to modulate the output of generating source 15. Due to the graduated spacing of the grid wires, variations in the potential supplied by source 24 will produce corresponding changes in the position of the transverse electronic short, or space charge, within wave guide 10. For relatively small negative potentials, electron space current will be cut off from only that portion of the cathode surrounded by the closer grid spacing. Similarly, as the applied grid voltage is increased negatively, electron space current will be cut off from a greater portion of the cathode. The ultimate result will be to modify the electrical length of wave guide 10 and tuning of the resonant structure, and hence to change the frequency of the voltage developed by generator source 15 in accordance with the signal pattern applied to grid 17. Thus, for example, if the grid voltage is varied linearly by applying a neagtive sawtooth voltage thereto as shown, the electron space current, hence the space charge, is periodically moved linearly along the longitudinal axis of wave guide 10. Moving the transverse space charge toward closed end 12 will decrease the resonant frequency, the minimum frequency limit being achieved when the space current is cut off for substantially the whole length of the cathode.

While in the particular embodiment there has been described a rectangular wave guide resonant structure, it will be understood that other resonant structures such as a coaxial line may be used. It should be further understood that the particular spacing of the grid wires which has been described in connection with Fig. 1 is not essential to the purposes of the invention. For example, the grid spacing may vary exponentially if it is so desired.

Figure 2:
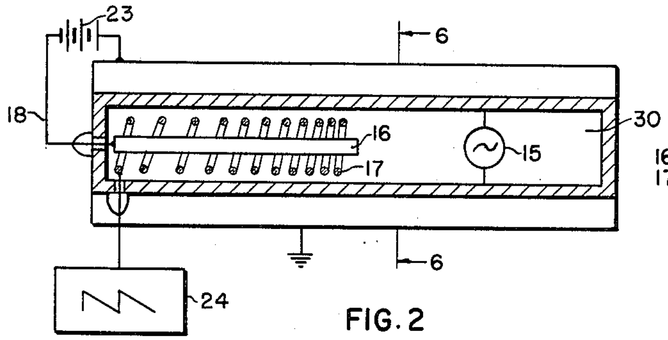
Fig. 2 illustrates schematically and in longitudinal section a preferred embodiment of my invention.
Figure 3:
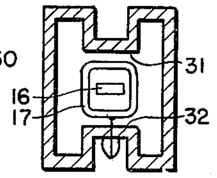
Fig. 3 is a transverse section through the resonant structure shown in Fig. 2, the plane of section being indicated by the line 6—6 of Fig. 2.

In the arrangement shown in Fig. 2, a "double ridged" wave guide 30 constitutes the resonant structure within which cathode 16 is longitudinally positioned between ridges 31 and 32. Cathode 16 is coated with an electron emissive material on only those surfaces facing inner ridge surfaces 31 and 32 so that the space charge emitted therefrom is concentrated within the ridged area. Thus, the electronic short is concentrated in the region of greatest density of electrical lines of force. The operation of this device is identical to that explained in connection with Fig. 1.

Figure 4:
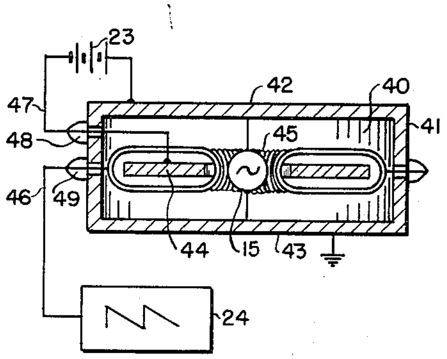
Fig. 4 illustrates an embodiment of my invention employing resonant cavities of the "pill-box" type.
Figure 5:
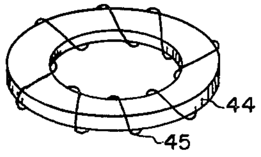
Fig. 5 is a perspective view of the grid and cathode structure employed in Fig. 4.

A still further application of the invention is represented in Fig. 4 which shows its use in a "pill-box" cavity resonator to adjust the resonant wavelength thereof. As shown in Fig. 4, high frequency generating source 15 is axially positioned within pill-box resonator 40. The construction of the high frequency generating source and means for its support within resonator 40 and the arrangement for applying potentials thereto are not shown, since such details are well known in the art.

Annular cathode 44 is centrally positioned within the resonator and the outer periphery thereof is radially spaced from lateral wall 41. Cathode 44 is coated with an electron emissive material only on the two surfaces facing top and bottom resonator plates 42 and 43, respectively. Surrounding cathode 44 is a toroidally wound grid 45 so that the spacing between adjacent grid wires increases from the inner periphery of annular cathode 44 to the outer periphery thereof. Thus, adjacent grid wires are closer at the inner periphery of cathode 45 than at the outer periphery of said cathode. Both cathode 44 and toroidally wound grid 45 are supported in position by leads such as 46 and 47 which extend through lateral wall 41 to glass seals 48 and 49, respectively. A D. C. voltage 23 is applied between cathode 44 and resonator 40 to create a space charge between the coated surfaces of the cathode and the inner surfaces of top and bottom plates 42 and 43. This space charge constitutes a cylindrical electronic short between said top and bottom plates. The radial position of the cylindrical electronic short may be varied by applying to grid 45 a source 24 of variable voltage with which it is desired to modulate the output of generator source 15. Due to the varied spacing of the grid wires at the inner periphery and the outer periphery of the annular cathode, variations in the potential supplied by source 24 will produce corresponding changes in the radial position of the cylindrical electronic short within resonator 40. For relatively small negative potentials electron space current will be cut off from only that portion of the annular cathode surrounded by the closer grid spacing. Similarly, as the applied grid voltage is increased negatively, electron space current, hence the space charge, will be cut off from a greater portion of the cathode. As previously explained, the tuning of the resonant structure and, hence the frequency of the voltage developed by source 15 will be varied in accordance with the signal pattern applied to grid 45.

While the invention has been described by reference to particular embodiments thereof, it will be understood that numerous modifications may be made therein by those skilled in the art without departing from the invention, and it is, therefore, aimed in the appended claim to cover all such modifications as fall within the true spirit and scope of the invention.

What is claimed is:

In combination, an evacuated wave guide, a source of high frequency electromagnetic waves positioned within said wave guide at one end thereof to generate a transverse electric field, the output frequency of said source being a function of the resonant wavelength of said wave guide, a cathode centrally positioned within said wave guide between the other end thereof and said source and which is electron emissive throughout its length to produce an electronic space charge coplanar with said transverse electric field whereby said field is short circuited, a grid surrounding said cathode for the entire length thereof, the spacing between successive grid turns being progressively decreased so that the grid wires surrounding one end of said cathode will be closer together than the grid wires surrounding the other end of said cathode, means for varying the potential on said grid for effectively cutting off the electron space current from a predetermined portion of said cathode to vary the spacing between said space charge and said generating source whereby the resonant wavelength of said wave guide is modified.

References Cited in the file of this patent

UNITED STATES PATENTS

| | | |
|---|---|---|
| 1,650,232 | Pickard | Nov. 22, 1927 |
| 2,241,976 | Blewett et al. | May 13, 1941 |
| 2,413,385 | Schmidt | Dec. 31, 1946 |
| 2,477,317 | Spencer | July 26, 1949 |